H. FORSMAN.
PIPE COUPLING.
APPLICATION FILED NOV. 7, 1917.
1,290,158.
Patented Jan. 7, 1919.
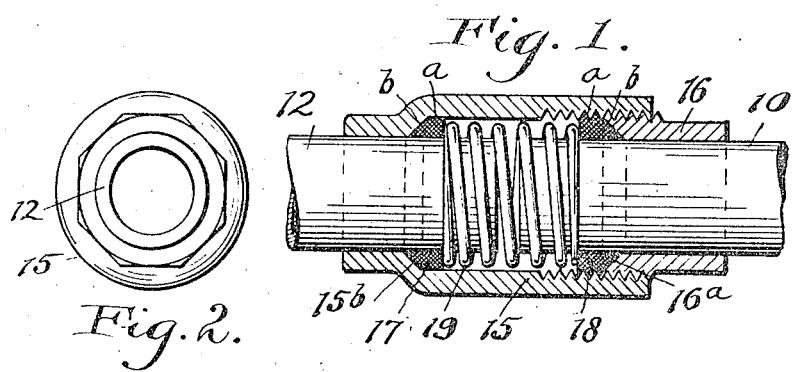
Inventor
Herman Forsman
by Thurston & Kwis
Attorneys

UNITED STATES PATENT OFFICE.

HERMAN FORSMAN, OF CLEVELAND, OHIO.

PIPE-COUPLING.

1,290,158.  Specification of Letters Patent.  Patented Jan. 7, 1919.

Application filed November 7, 1917. Serial No. 200,651.

*To all whom it may concern:*

Be it known that I, HERMAN FORSMAN, a citizen of the United States, residing at Cleveland, in the county of Cuyahoga and State of Ohio, have invented a certain new and useful Improvement in Pipe-Couplings, of which the following is a full, clear, and exact description.

The object of this invention is to provide an inexpensive but thoroughly practical coupling for connecting two pipes and making a tight joint therebetween, while permitting such contraction and expansion of the pipes, as is occasioned by changing temperatures, without injuring the coupling or rendering the joint leaky.

The invention consists in the construction and combination of parts shown in the drawing, hereinafter described and pointed out definitely in the appended claim.

In the drawings, Figure 1 is a central longitudinal section of a pipe coupling which embodies this invention in its preferred form, and is adapted for connecting together two alined pipes; Fig. 2 is an end view of sleeve 15.

The coupling is shown in Fig. 1 in the form adapted for connecting to alined pipes 10 and 12 of substantially the same diameter. This coupling consists of a sleeve 15, a follower 16, two deformable packing washers 17 and 18, and the coil spring 19. This sleeve is internally threaded at one end, is of reduced diameter at its other end so as to loosely fit around the pipe 10, which is passed into the sleeve from this end; and the sleeve also contains adjacent the reduced end an internal annular shoulder 15$^b$, which is tapered to form a packing seat. The follower 16 is tubular, so that it may loosely fit around the pipe 10 which passes through it, is externally threaded so that it may be screwed into sleeve 15, and it has on its inner end a tapered annular packing seat 16$^a$.

The packing washers 17 and 18 may be made of leather, rubber, or any other suitable material which may be deformed by pressure exerted by the spring 19. Each consists of a cylindrical portion $a$ which normally loosely fits within sleeve 15, and a frusto-conical portion $b$ constructed to engage and fit that one of the tapered seats 15$^b$ or 16$^a$ to which it is adjacent. Each of these washers is an annulus which normally fits loosely around that one of the pipes 10 or 12 which passes through it.

The coil spring 19 surrounds the two pipes 10 and 12 within sleeve 15, and is of such length that when the follower is screwed into the sleeve its ends will engage the two washers and the spring itself will be compressed increasingly as the follower is screwed in. Obviously, the end thrust of the spring is equally taken by the follower at one end and by the shoulder 15$^b$ at the other end. When, therefore, the described coupling has been applied in the manner shown to two alined pipes 10 and 12, the ends of which should be fairly close together, the follower 16 is screwed into sleeve 15, the resulting compression of the spring will cause it to push endwise against both washers with such force that each will be squeezed between the spring and the adjacent washer seat, to such a degree that each will be deformed more or less as circumstances require, whereby the cylindrical part of each washer will come to fit tightly within sleeve 15, and the tapered part $a$ will come to tightly embrace that one of the pipes 10 and 12 which passes through it. Of course, the tapered conformation of the packing seat and the reciprocal taper on the washer contributes to the production of the result last mentioned, namely, the contraction of the washer will cause it to tightly embrace the surrounded pipe.

It will be noted that the described coupling is self contained in the sense that it is not necessary to anchor either pipe to some external object in order that by screwing in the follower the spring will be compressed so as to yieldingly apply deforming pressure to both washers. The end thrust of the spring is ultimately taken by the follower and by the annular shoulder which is within and is an immovable part of the sleeve. As a result both pipes may expand or contract, as the result of changing temperature, without causing any leak; because either or both of the pipes 10, 12, may merely slip in the washer which tightly embraces it.

Having described my invention, I claim:—

A coupling for connecting two alined pipes, comprising five elements only, to wit, a coupling sleeve which loosely embraces the two alined pipes to be coupled near their adjacent ends, and which is internally screw threaded at one end, and has at its other end a small diametered portion which has a long bearing upon and slidably fits one of said pipes, said sleeve having an internal conical seat adjacent the small diametered end thereof, a tubular follower which slidably embraces and has a long bearing upon the other pipe,—which follower is externally screw threaded and screws into said sleeve and has on its inner end a conical seat, two deformable washers fitted within said sleeve and tightly fitted around the two pipes respectively and being fitted respectively to the two conical seats referred to and having their opposed ends in planes which are normal to the axis of the pipe, and a coil spring located within the sleeve around said two pipes and being under compression and in contact at its ends with said two washers and exerting pressure upon them in lines parallel with said axis.

In testimony whereof, I hereunto affix my signature.

HERMAN FORSMAN.

Copies of this patent may be obtained for five cents each, by addressing the "Commissioner of Patents, Washington, D. C."